United States Patent Office 2,886,441
Patented May 12, 1959

2,886,441

PRODUCT AND PROCESS

Franklin Kramer, Lexington, Harold Rosenthal, Newtonville, and Arthur F. Tole, Melrose, Mass., assignors to General Foods Corporation, New York, N.Y., a corporation of Delaware No Drawing. Application July 3, 1956
Serial No. 595,610

12 Claims. (Cl. 99—135)

This invention relates to an improved chewing gum having a flavor which is controllably released over an extended period of time and to a process for preparing the same.

Chewing gum may comprise a substantially water insoluble, chewable, plastic gum base such as chicle, or substitutes therefor, including jelutong, guttakay, rubber, or certain comestible natural or synthetic resins or waxes. Incorporated with the gum base, and in intimate admixture therewith, may be plasticizers or softening agents, e.g. glycerine; flavoring agents, e.g. oil of wintergreen, oil of spearmint, oil of peppermint, licorice, fruit flavors, spice oils, etc.; or sweetening agents which may be sugars including sucrose or dextrose and/or they may be artificial sweeteners such as cyclamates or saccharin. Other optional ingredients may also be present.

It is found that when most flavored chewing gums, such as slab gums, are chewed the initial perception of flavor appears after a minute or more at a low level, and after three or four minutes of chewing the flavor intensity drops to an uninteresting level. It is also found upon analysis, that gum chewed for as long as thirty minutes may retain as much as 60% of the flavor initially present, and that this proportion of the flavoring agent is thus not effectively used.

It is an object of this invention to provide a chewing gum containing a flavoring composition characterized by an extended period of controlled flavor release. A second object of this invention is to provide a chewing gum containing a flavoring composition which is simiilar in flavor character to that of the original oil. A third object of this invention is to increase the total amount of flavor released during the chewing period of gums containing the herein described flavoring composition. A fourth object of this invention is to permit reduction in the amount of flavoring oil necessary to obtain a desired flavor level in a chewing gum. Other objects of this invention will be apparent to those skilled-in-the-art from the following detailed description of the invention.

It has now been discovered that it is possible to obtain a chewing gum containing a flavoring composition characterized by extended flavor perception time, true flavor character, controlled release of a large proportion of flavoring agent, and reduction in amount of flavor oil required. This flavoring composition comprises a tunnel-dried emulsion of discrete micro-droplets of a volatile, water-immiscible flavoring agent dispersed in finely divided particles of gelatin. Preparation of the flavoring composition employed in the chewing gum product of this invention may be effected by emulsifying the flavoring agent in an aqueous solution of the gelatin and tunnel-drying the so-formed emulsion.

The gelatin which may be employed in this invention may be any of the grades and types of gelatin, including those obtained from e.g. tanner's stock, ossein, pigskin, etc. The Bloom of the gelatin which is employed may vary widely. When a rapid release is desired, it is preferred to use gelatin having a Bloom less than 50. When slower flavor release is desired, the Bloom preferably will be above about 200. For intermediate degrees of flavor release, it is preferred to use Blooms between these values. Although the pH of the gelatin solution employed may fall within the range of 2 to 10, it is preferred that it be maintained in the acid region, e.g. 2 to 5.

In carrying out the process of this invention, a gelatin solution may be formed containing 5 to 100, say 50 parts of gelatin per one hundred parts of water, the latter being preferably at temperature of of 90° F. to 180° F., say 120° F. during dissolution of the gelatin. The solution is allowed to cool preferably to 33° F. to 75° F., say 60° F., and it is then formed into slabs which are tunnel dried or slab dried, the two terms being synonomous as used herein.

Prior to the solidification or drying of the gelatin solution and preferably after cooling to 80° F. to 140° F., say 110° F., the desired volatile, water-immiscible flavoring agent may be added to the solution and homogenized to form an emulsion. The flavoring agents which may be employed include oil of peppermint, oil of spearmint, fruit essences, licorice, spice oils and the like. The selected flavoring agent may be added in amount of 10% to 100%, say 50% by weight of the gelatin.

When the emulsion of flavoring agent in gelatin solution is solidified as by tunnel drying of slabs, the resultant tunnel-dried emulsion has the flavoring agent encapsulated therewithin in the form of discrete micro-droplets. Preferably the solid dried emulsion will be reduced to powder form which may be 20 mesh to 400 mesh, say 100 mesh. The resultant material comprises a tunnel-dried emulsion of discrete micro-droplets of a volatile, water-immiscible flavoring agent dispersed within finely divided particles of gelatin. The flavoring agent is encapsulated or locked within the dry gelatin particles.

Formation of flavored chewing gum may be effected by mixing from 3% to 30%, say 15% by weight of flavoring composition with from 70% to 97%, say 85% by weight of gum base. Typically the gum base will be chicle, although it may be jelutong, guttakay, etc. Other ingredients including sweetening agents, coloring agents, etc. may be present in desired amount.

Although the chewing gums of this invention may be prepared from a single flavoring agent, it is possible to extend the range of properties of the gum by use of combinations of two or more flavoring compositions. For example, it is possible to separately prepare dry flavoring compositions from gelatins of various Blooms, and then to add these compositions to a gum. Such a chewing gum may for example contain a mixture of flavoring compositions prepared from a low Bloom gelatin (characterized by a comparatively rapid flavor release) and a high Bloom gelatin (characterized by a comparatively slow flavor release). The properties of the chewing gum product will be intermediate to the properties obtained from each of the flavoring compositions when used separately. Specifically if a flavoring composition formed from 50 Bloom gelatin is mixed with a flavoring composition formed from 200 Bloom gelatin, and the mixture is added to a chewing gum, the product may have a flavor release which is substantialy more even over the chewing period than is the case when a single flavoring composition is employed.

Similarly it is possible to modify the properties of the product gum by use of mixtures of flavoring compositions characterized by different ratios of gelatin to oil. If a composition containing 10% flavoring agent by weight of gelatin is mixed with one containing 100% flavoring agent by weight of gelatin (i.e. equal parts of gelatin and flavoring agent), the resulting blend of flavoring composition will yield a chewing gum having a more even liberation of flavor than is obtained by use of either flavoring agent alone.

Controlled liberation of flavor of the product chewing gum, may also be obtained by using mixtures of flavoring compositions (a) of different particle size, the resulting gum deriving much of its initial flavor from the smaller particles and much of its later flavor from the larger particles; or (b) formed from gelatins of different pH, the composition formed from gelatin of higher pH (e.g. 9) giving quick release of flavor, while that formed from lower pH (e.g. 2.5) giving slower release.

It is also possible to obtain chewing gum products having extended flavor liberation time by use of the herein described fixed flavors in combination with unfixed flavors, whereby the initial flavor sensation may be derived from the unfixed flavor and the later sensation from the fixed flavor. A particularly desirable product contains unfixed flavor and slab-dried flavor in about equal proportions.

The resulting chewing gum may include an all-enveloping mass of gum base such as chicle, within which is substantially uniformly distributed particles of gelatin-encapsulated flavoring agent. Although the mixing procedure followed may result in transfer of some of the flavoring agent from the gelatin-encapsulation to the gum, substantially all of the flavoring agent which was admitted will still be found in the gelatin-encapsulation after mixing.

It is characteristic of this chewing gum product that it retains its flavor under conditions of vigorous chewing for extended periods which may be double that of compositions heretofore known to those skilled-in-the-art. For example, the flavor perception time may be six minutes or longer, in contrast to the usual three minutes which is the flavor perception time of comparable products heretofore known.

The chewing gum so formed is also characterized by high degree of flavor release. The products herein described may retain as little as 25%–35% of the flavor originally present after mastication for 30 minutes. Gums heretofore available, when chewed for the same time, are found to retain as much as 60% of the flavor originally present which is being released at such a slow rate that the intensity of flavor is at an uninteresting level.

The greater availability of flavor by use of the slab-dried flavoring compositions herein described also permits attainment of high flavor level in the chewing gum products with use of lower amounts of the flavoring oils.

Chewing gums prepared with the slab-dried flavor composition in accordance with this invention, have a flavor character more nearly that of the original flavor oil than chewing gum prepared by the direct incorporation of the flavoring oil into the chewing gum.

The following specific example will serve to illustrate a preferred embodiment of this invention:

Example I

According to a specific example of this invention, 40 parts by weight of 50 Bloom gelatin was added to 60 parts by weight of water at temperature of 150° F. The mixture was agitated until the gelatin completely dissolved and then the solution was cooled to 120° F. 20 parts by weight of methyl salicylate (oil of wintergreen) were added to the solution and homogenized to form an emulsion. The emulsion was poured into pans and chilled for 1 hour to 60° F. The resultant 0.375 inch thick slabs were air dried with circulating air at room temperature (75° F.). The solid gelatin was ground to 24–35 mesh particle size.

100 parts by weight of chicle were admixed with 18 parts by weight of the above-prepared slab-dried gelatin-encapsulated flavor. 300 parts of sucrose and 100 parts corn syrup were added. Mixing was effected in a ribbon blender with jacketed side walls of the type manufactured by the Baker Perkins Co.

A taste test was made to compare a chewing gum product of this invention with a standard chewing gum containing the same total amount of flavor in unfixed form. During the tests, 0.5" x 0.75" x 0.0625" slabs of each gum were separately chewed and the following were noted: time and intensity of initial flavor, extent of flavor burst, duration of interesting flavor level, and approximate total time during which flavor was available. In these tests, the rating of flavor intensity was measured by the person chewing, on a scale ranging from 0 to 10, the level of 1 indicating threshold flavor intensity just discernible to the taste, and a level of 10 indicating a maximum intensity above which the sensation originating in the flavor is unpleasant.

The commercially available standard containing unfixed flavor in chicle was characterized by initial indication of flavor at a level of 1 after about 7–8 seconds. Intensity rose to 3 at about 15 seconds, and thereafter at a slower rate to a level of 6 at about 60 seconds. At this point, flavor intensity dropped off to 3 after about 90 seconds. At about 2 minutes, the flavor intensity was at the uninteresting low level of 1.5. After 4 minutes of chewing, the flavor had dropped below the threshold value of 1, and the standard gum was flat and lifeless.

Initial flavor liberation in a sample prepared according to this invention and containing slab-dried flavoring composition occurred at level of 2 after 5 seconds. Intensity continuously rose at gradual rate to a level of 10 after about 2 minutes. Thereafter it dropped only slightly and at 4 minutes, it was still at a level of about 9. After 6 minutes, the intensity had dropped to 6. Flavor was very apparent for total time of about 10 minutes at which point the intensity had dropped to the threshold value of 1. During the entire period of the test, the flavor was rich and full-bodied and substantially true in character.

For ease of comparison, the results of the taste tests are presented in tabular form:

| Time | Standard | Typical New Product |
|---|---|---|
| 5 Seconds | | 2 |
| 7 Seconds | 1 | 3 |
| 10 Seconds | 2 | 5 |
| 15 Seconds | 3 | 6 |
| 20 Seconds | 4 | 7 |
| 30 Seconds | 5 | 9 |
| 60 Seconds | 6 | 9.5 |
| 90 Seconds | 3 | 9.5 |
| 2 Minutes | 1.5 | 10 |
| 3 Minutes | 1 | 9.5 |
| 4 Minutes | 1 | 9 |
| 5 Minutes | | 8.5 |
| 6 Minutes | | 6 |
| 7 Minutes | | 5 |
| 8 Minutes | | 4 |
| 9 Minutes | | 3 |
| 10 Minutes | | 1 |

It is apparent to the person making the chewing test that the slab-dried sample prepared in accordance with this invention is superior to the sample containing the same amount of flavoring oil in unfixed form. Specifically the tunnel-dried product of this invention is characterized by extended flavor perception time, early flavor release, a true flavor character which is substantially that of the flavoring agent, and a high degree of flavor release.

The term "encapsulate," as used herein, means that after the flavoring oil has been emulsified in the gelatin solution and the gelatin has been formed into a chilled slab, tunnel-dried, and ground, each of the very fine particles of gelatin will be found to contain uniformly distributed micro-droplets of the flavoring oil.

Although we have herein described a specific example showing certain details of our invention, it will be appar-

What is claimed is:

1. A chewing gum comprising particles of a tunnel-dried emulsion of discrete micro-droplets of a volatile, water-immiscible flavoring agent dispersed in finely divided particles of gelatin, and an all-enveloping mass of a chewable gum base within which the particles are substantially uniformly distributed.

2. A chewing gum as claimed in claim 1 wherein said chewable gum base within which the particles of tunnel-dried gelatin are substantially uniformly distributed contains free unfixed flavoring agent.

3. A chewing gum comprising particles of a tunnel-dried emulsion of discrete micro-droplets of a volatile, water-immiscible flavoring agent dispersed in 20–400 mesh particles of gelatin, and an all-enveloping mass of a chewable gum base within which the particles are substantially uniformly distributed.

4. A chewing gum comprising 3% to 30% by weight of a tunnel-dried emulsion of discrete micro-droplets of a volatile water-immiscible flavoring agent dispersed in finely divided particles of gelatin, and 70% to 97% by weight of an all-enveloping mass of a chewable gum base within which the particles are substantially uniformly distributed.

5. A chewing gum comprising a tunnel-dried emulsion of a volatile water-immiscible flavoring agent dispersed in the form of discrete micro-droplets in finely divided particles of low Bloom gelatin, and an all-enveloping mass of a chewable gum base within which the particles are substantially uniformly distributed.

6. A chewing gum as claimed in claim 5 wherein said gelatin has a Bloom of less than 50 whereby rapid release of flavor is effected.

7. A chewing gum comprising particles of low pH gelatin characterized by slow flavor release and particles of high pH gelatin characterized by rapid flavor release, each containing dispersed therewithin in tunnel-dried emulsion form discrete micro-droplets of a volatile water-immiscible flavoring agent, and an all-enveloping mass of a chewable gum base within which the particles are substantially uniformly distributed whereby as the chewing gum is chewed the flavor is released substantially evenly and uniformly over the extended chewing time.

8. A chewing gum comprising particles of low Bloom gelatin characterized by rapid flavor release, and particles of high Bloom gelatin characterized by slow flavor release each containing dispersed therewithin in tunnel-dried emulsion form discrete micro-droplets of a volatile water-immiscible flavoring agent, and an all-enveloping mass of a chewable gum base within which the particles are substantially uniformly distributed whereby as the chewing gum is chewed the flavor is released substantially evenly and uniformly over the extended chewing time.

9. The method of preparing a chewing gum comprising forming a solid tunnel-dried emulsion of a volatile, water-immiscible flavoring agent encapsulated within finely divided particles of gelatin, and substantially uniformly distributing said gelatin-encapsulated flavoring agent within an all-enveloping mass of a chewable gum base.

10. The method of preparing a chewing gum comprising forming a gelatin solution, mixing therewith a volatile, water-immiscible flavoring agent thereby forming an emulsion, tunnel-drying said emulsion whereby solid gelatin particles are formed containing therewithin said flavoring agent in the form of discrete micro-droplets, and substantially uniformly distributing said gelatin particles containing flavoring agent within an all-enveloping mass of a chewable gum base.

11. The method of preparing a chewing gum comprising mixing volatile, water-immiscible flavoring agent with a gelatin solution at temperature of about 80° F.–140° F., thereby forming an emulsion, cooling said gelatin solution to 33° F.–75° F., tunnel-drying and particulating said emulsion to form particles of gelatin each containing said flavoring agent in the form of discrete micro-droplets, and incorporating said particles within an all-enveloping mass of a chewable gum base.

12. The method of preparing a chewing gum characterized by extended flavor perception time, true flavor character and high degree of flavor release comprising forming a solid tunnel-dried emulsion of a volatile, water-immiscible flavoring agent encapsulated within finely divided particles of gelatin, and substantially uniformly distributing said gelatin-encapsulated flavoring agent within an all-enveloping mass of a chewable gum base.

References Cited in the file of this patent
UNITED STATES PATENTS

| | | |
|---|---|---|
| 1,526,039 | Arkell et al. | Feb. 10, 1925 |
| 1,993,289 | Stokes et al. | Mar. 5, 1935 |
| 2,157,839 | Wertheimer | May 9, 1939 |
| 2,258,567 | Epstein et al. | Oct. 7, 1941 |
| 2,369,847 | Olsen et al. | Feb. 20, 1945 |